US010259455B2

(12) United States Patent
Regmi (10) Patent No.: US 10,259,455 B2
(45) Date of Patent: Apr. 16, 2019

(54) COLLISION AVOIDANCE SYSTEMS AND METHODS

(71) Applicant: Ford Global Technologies, LLC, Dearborn, MI (US)

(72) Inventor: Sagar Kumar Regmi, San Jose, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/415,735

(22) Filed: Jan. 25, 2017

(65) Prior Publication Data

US 2018/0208190 A1   Jul. 26, 2018

(51) Int. Cl.
| | |
|---|---|
| B60W 30/00 | (2006.01) |
| B60W 30/09 | (2012.01) |
| G08G 1/16 | (2006.01) |
| G01S 17/00 | (2006.01) |
| G06K 9/00 | (2006.01) |

(52) U.S. Cl.
CPC ............. B60W 30/09 (2013.01); G01S 17/00 (2013.01); G06K 9/00825 (2013.01); G08G 1/166 (2013.01); *B60W 2420/403* (2013.01); *B60W 2420/52* (2013.01); *B60W 2550/10* (2013.01); *B60W 2550/30* (2013.01)

(58) Field of Classification Search
CPC ........ B60W 30/00; B60W 30/09; G08G 1/16; G08G 1/162; G08G 1/164
See application file for complete search history.

(56) References Cited

U.S. PATENT DOCUMENTS

| 6,119,068 A | 9/2000 | Kannonji |
| 9,092,986 B2 * | 7/2015 | Salomonsson ......... G08G 1/167 |
| 9,318,020 B2 * | 4/2016 | Salomonsson ... G08G 1/096725 |
| 9,563,809 B2 * | 2/2017 | Salomonsson ......... G08G 1/167 |
| 2002/0067287 A1 * | 6/2002 | Delcheccolo ...... B60K 31/0008 340/901 |
| 2014/0309884 A1 * | 10/2014 | Wolf ......................... B60T 8/17 701/41 |
| 2015/0160653 A1 * | 6/2015 | Cheatham, III ..... G05D 1/0088 701/23 |
| 2016/0039411 A1 * | 2/2016 | Park ........................ G01S 13/87 701/70 |
| 2016/0200318 A1 | 7/2016 | Parikh et al. |
| 2016/0229397 A1 | 8/2016 | Muthukumar |
| 2016/0244055 A1 * | 8/2016 | Wolf ......................... B60T 8/17 |

(Continued)

FOREIGN PATENT DOCUMENTS

| CN | 103496366 A | 1/2014 |
| DE | 102005062275 A1 | 6/2007 |

(Continued)

*Primary Examiner* — Yonel Beaulieu
(74) *Attorney, Agent, or Firm* — David R. Stevens; Stevens Law Group (57) ABSTRACT

Example collision avoidance systems and methods are described. In one implementation, a method receives data from multiple sensors mounted to a first vehicle. A collision avoidance system determines a likelihood that a second vehicle will collide with the back of the first vehicle based on the received data. If a collision is likely, the method identifies open space near the first vehicle and determines a best action to avoid or mitigate the likely collision based on the identified open space.

18 Claims, 5 Drawing Sheets

(56) References Cited

U.S. PATENT DOCUMENTS

| | | | |
|---|---|---|---|
| 2017/0120907 A1* | 5/2017 | Wolf | B60T 8/17 |
| 2017/0132483 A1* | 5/2017 | Salomonsson | G08G 1/167 |
| 2017/0137023 A1* | 5/2017 | Anderson | B60W 30/02 |
| 2017/0291602 A1* | 10/2017 | Newman | B60W 30/09 |
| 2018/0001952 A1* | 1/2018 | Rajamani | B62J 27/00 |
| 2018/0079359 A1* | 3/2018 | Park | B60Q 9/008 |

FOREIGN PATENT DOCUMENTS

| | | |
|---|---|---|
| DE | 102009008142 A1 | 8/2010 |
| JP | 2008290600 A | 12/2008 |

\* cited by examiner

COLLISION AVOIDANCE SYSTEMS AND METHODS

TECHNICAL FIELD

The present disclosure relates to vehicular systems and, more particularly, to systems and methods that avoid collisions between vehicles.

BACKGROUND

Automobiles and other vehicles provide a significant portion of transportation for commercial, government, and private entities. Vehicles, such as autonomous vehicles, drive on roadways that may experience structural decay and other problems that put vehicles, and their occupants, at risk. In some situations, a vehicle may be at risk for collision by another vehicle approaching from behind. For example, a first vehicle may suddenly stop or slow down to avoid an obstacle or stopping vehicles ahead of the first vehicle. In this situation, the first vehicle is at risk of being hit from behind by a second vehicle that doesn't stop fast enough. Early detection of a potential collision gives the vehicle time to take action to avoid or mitigate the collision.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

Figure 1:
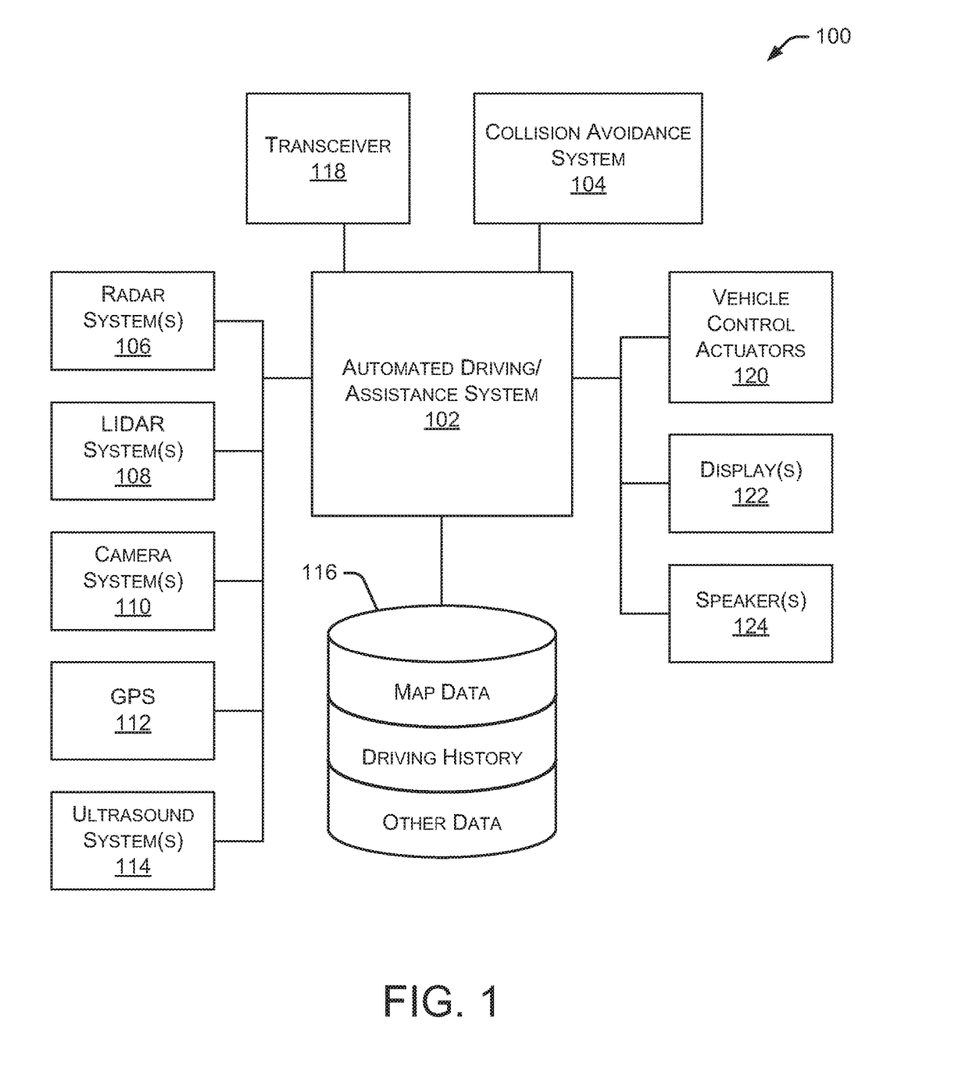
FIG. 1 is a block diagram illustrating an embodiment of a vehicle control system that includes a collision avoidance system.

FIG. 1 is a block diagram illustrating an embodiment of a vehicle control system 100 within a vehicle that includes a collision avoidance system 104. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, vehicle locks, or any other auxiliary systems of the vehicle. In another example, the automated driving/assistance system 102 may not be able to provide any control of the driving (e.g., steering, acceleration, or braking), but may provide notifications and alerts to assist a human driver in driving safely. Vehicle control system 100 includes collision avoidance system 104 that interacts with various components in the vehicle control system to detect and respond to potential (or likely) collisions with other vehicles. In one embodiment, collision avoidance system 104 detects a potential collision (e.g., a collision from a vehicle approaching from the rear) and adjusts one or more vehicle operations to avoid or mitigate the potential collision, such as maneuvering the vehicle into a different lane of traffic. Although collision avoidance system 104 is shown as a separate component in FIG. 1, in alternate embodiments, collision avoidance system 104 may be incorporated into automated driving/assistance system 102 or any other vehicle component.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The one or more camera systems 110 may include a rear-facing camera mounted to the vehicle (e.g., a rear portion of the vehicle), a front-facing camera, and a side-facing camera. Camera systems 110 may also include one or more interior cameras that capture images of passengers and other objects inside the vehicle. The vehicle control system 100 may include a data store 116 for storing relevant or useful data for navigation and safety, such as map data, driving history, or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, door locks, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver or passenger notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. A path may also be determined based on a route that maneuvers the vehicle to avoid or mitigate a potential collision. The sensor systems/devices 106-110 and 114 may be used to obtain real-time sensor data so that the automated driving/assistance system 102 can assist a driver or drive a vehicle in real-time.

Figure 2:
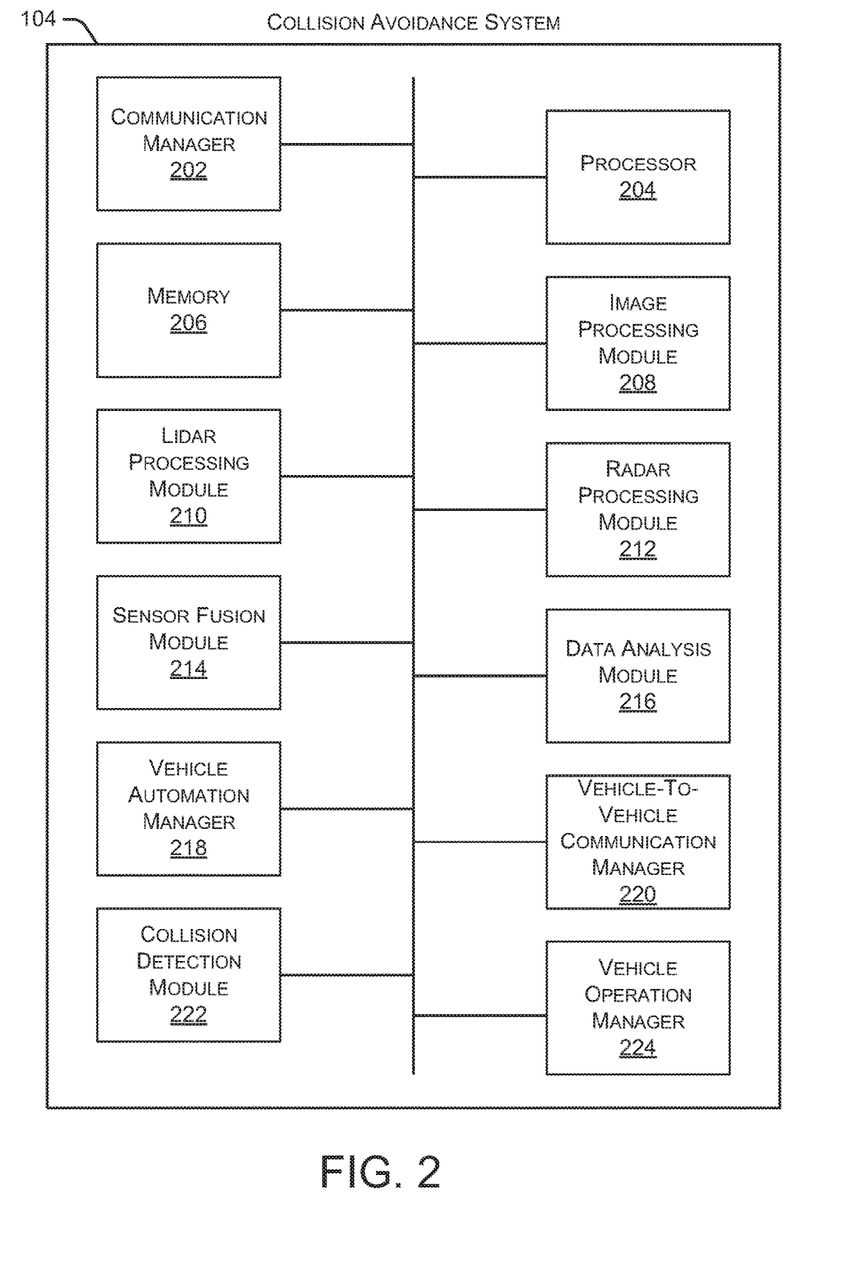
FIG. 2 is a block diagram illustrating an embodiment of a collision avoidance system.

FIG. 2 is a block diagram illustrating an embodiment of collision avoidance system 104. As shown in FIG. 2, collision avoidance system 104 includes a communication manager 202, a processor 204, and a memory 206. Communication manager 202 allows collision avoidance system 104 to communicate with other systems, such as automated driving/assistance system 102. Processor 204 executes various instructions to implement the functionality provided by collision avoidance system 104 as discussed herein. Memory 206 stores these instructions as well as other data used by processor 204 and other modules and components contained in collision avoidance system 104.

Additionally, collision avoidance system 104 includes an image processing module 208 that receives image data from one or more camera systems 110 and identifies, for example, other vehicles approaching the parent vehicle (i.e., the vehicle containing collision avoidance system 104). In some embodiments, image processing module 208 includes a collision detection algorithm that identifies a potential collision between the parent vehicle and a vehicle approaching from the rear. For example, the collision detection algorithm may identify a distance between the parent vehicle and the approaching vehicle as well as the speed of the approaching vehicle. Based on the distance and speed of the approaching vehicle, the collision detection algorithm can determine the likelihood of a collision between the two vehicles (e.g., the likelihood that the approaching vehicle will impact the rear of the parent vehicle).

A LIDAR processing module 210 receives LIDAR data from one or more LIDAR systems 108 and identifies, for example, a potential collision with another vehicle. In some embodiments, the collision detection algorithm detects vehicles approaching from the rear based on LIDAR data. Additionally, a radar processing module 212 receives radar data from one or more radar systems 106 to identify, for example, a potential collision with another vehicle. In some embodiments, the collision detection algorithm uses the radar data to detect another vehicle approaching from the rear.

Collision avoidance system 104 also includes a sensor fusion module 214 that fuses data from multiple sensors, cameras, and data sources, as discussed herein. For example, sensor fusion module 214 may fuse data from one or more cameras 110, radar systems 106, and LIDAR systems 108 to detect a potential collision and determine possible actions that can avoid or mitigate the potential collision. A data analysis module 216 performs various operations on data received from any number of sensors and/or data sources to detect the likelihood of a collision between two vehicles, as discussed herein.

Additionally, collision avoidance system 104 includes a vehicle automation manager 218 that manages the operation of various vehicle automation functions discussed herein. Vehicle automation manager 218 can operate independently or in combination with automated driving/assistance system 102. A vehicle-to-vehicle communication manager 220 allows multiple vehicles to communicate with one another. For example, a vehicle may communicate a potential collision to other nearby vehicles. Also, a vehicle can communicate its intended actions to other vehicles, such as a lane change, to avoid or mitigate a potential collision. In some embodiments, a vehicle can communicate a potential collision and/or its intended actions to an infrastructure system using a V2X (Vehicle-to-Infrastructure) communication system.

Collision avoidance system 104 also includes a collision detection module 222 that detects a possible collision by an approaching vehicle. In some embodiments, collision detection module 222 implements a collision detection algorithm (such as the algorithm discussed above) that identifies a potential collision between the parent vehicle and a vehicle approaching from the rear. For example, the collision detection algorithm may use data from one or more vehicle sensors to identify a distance between the parent vehicle and the approaching vehicle as well as the speed of the approaching vehicle. Based on the distance and speed of the approaching vehicle, the collision detection algorithm can determine the likelihood of a collision between the two vehicles (e.g., the likelihood that the approaching vehicle will impact the rear of the parent vehicle).

A vehicle operation manager 224 manages the operation of a vehicle based on the detection of a potential collision, such as stopping the vehicle or maneuvering the vehicle into a different lane of the roadway. In some embodiments, the vehicle may be maneuvered to the side (or shoulder) of the roadway to avoid or mitigate the potential collision. In some embodiments, vehicle operation manager 224 generates recommendations for maneuvering the vehicle based on the automated driving levels available to the vehicle. For example, different automated driving levels allow the vehicle to autonomously take certain actions without intervention by a driver. In an example embodiment, vehicles may have one of three different automated driving levels as detailed below.

Automated Driving Level 1—The vehicle's automated driving/assistance system 102 can automatically drive the vehicle within its current lane, but cannot change lanes.

Automated Driving Level 2—The vehicle's automated driving/assistance system 102 can perform Level 1 activities and can automatically drive the vehicle into an emergency lane or shoulder of the roadway.

Automated Driving Level 3—The vehicle's automated driving/assistance system 102 can perform Level 1 and 2 activities as well as automatically driving the vehicle into another lane of traffic.

In this embodiment, vehicle operation manager 224 generates recommendations for maneuvering the vehicle based on the driving actions permitted by the automated driving level associated with the vehicle.

In a particular implementation, the different automated driving levels are defined as SAE (Society of Automotive Engineers) driving levels. For example, the SAE currently defines six levels of driving automation from "no automation" to "full automation." In the current SAE levels of driving automation, SAE level 5 is fully autonomous (similar to level 3 discussed above), SAE level 3 is conditional automation (similar to level 2 discussed above) and SAE level 2 is partial automation (similar to level 1 discussed above).

Figure 3:
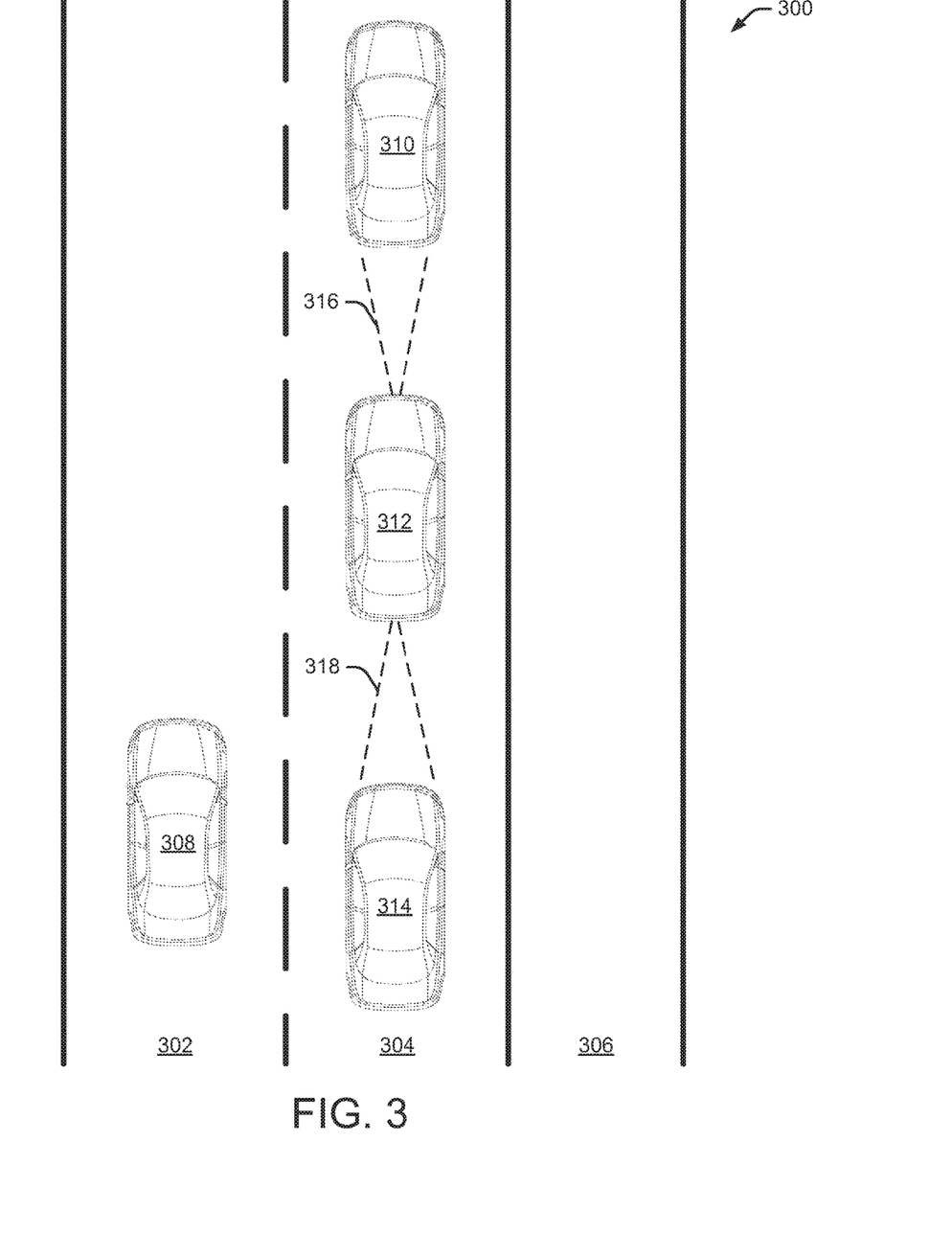
FIG. 3 illustrates an embodiment of a roadway with multiple vehicles traveling in the same direction.

FIG. 3 illustrates an embodiment of a roadway 300 with multiple vehicles traveling in the same direction. In the example of FIG. 3, roadway 300 has three lanes 302, 304, and 306. Lanes 302 and 304 are driving lanes of traffic moving in the same direction. Lane 306 is an emergency lane or shoulder of roadway 300. Four vehicles 308, 310, 312, and 314 are driving on roadway 300. Vehicle 308 is driving in lane 302 and vehicles 310, 312, and 314 are driving in lane 304. As shown in FIG. 3, no vehicles are driving (or parked) in lane 306.

In an example situation, vehicle 310 stops suddenly (e.g., due to an obstacle in roadway 300 or traffic ahead of vehicle 310 stopping suddenly). In this situation, vehicle 312 needs to stop quickly to avoid colliding with vehicle 310. One or more sensors on vehicle 312 (e.g., front-facing sensors) receive 316 data associated with a location and speed of vehicle 310. This data is used by vehicle 312 to detect the sudden stopping of vehicle 310. When vehicle 312 stops quickly, it may notify other nearby vehicles of the stopping action so the nearby vehicles can take appropriate actions to avoid a collision. In some embodiments, vehicle 312 notifies other nearby vehicles of the stopping action using V2V (vehicle-to-vehicle) communication systems or any other communication mechanism. For example, vehicle 314 may receive the V2V communication and begin stopping to avoid a collision with vehicle 312. In some embodiments, if vehicle 314 is equipped with a V2V communication system, vehicle 314 can notify vehicle 312 regarding its "brake applied status" using an EEBL (Emergency Electronic Brake Light) message. The collision avoidance system in vehicle 312 can use this message from vehicle 314 (along with sensor fusion data from rear sensors on vehicle 312) to determine the likelihood of collision.

In some embodiments, one or more sensors on vehicle 312 (e.g., rear-facing sensors) receive 318 data associated with a location and speed of vehicle 314. This data is used by vehicle 312 to detect the likelihood that vehicle 314 will collide with the back of vehicle 312. If vehicle 312 determines a likelihood that vehicle 314 will collide with vehicle 312, it may take action to avoid or mitigate the damage from the collision. In the embodiment of FIG. 3, vehicle 312 may: 1) automatically move as close as possible to vehicle 310, thereby giving vehicle 314 as much space as possible to stop before impacting vehicle 312; 2) automatically drive vehicle 312 into emergency lane/shoulder 306, thereby avoiding the collision with vehicle 314; or 3) automatically drive vehicle 312 into lane 302 to avoid the collision with vehicle 314. As discussed herein, the actions available to vehicle 312 may vary depending on the automated driving levels available to vehicle 312. For example, if vehicle 312 is not permitted to change into another lane of traffic, its available actions are limited to stopping in lane 304 (moving as close as possible to vehicle 310) or driving into emergency lane/shoulder 306. The action performed by vehicle 312 is communicated to other nearby vehicles (e.g., vehicles 308, 310, and 314) so they can take any actions necessary based on the action performed by vehicle 312.

Figure 4:
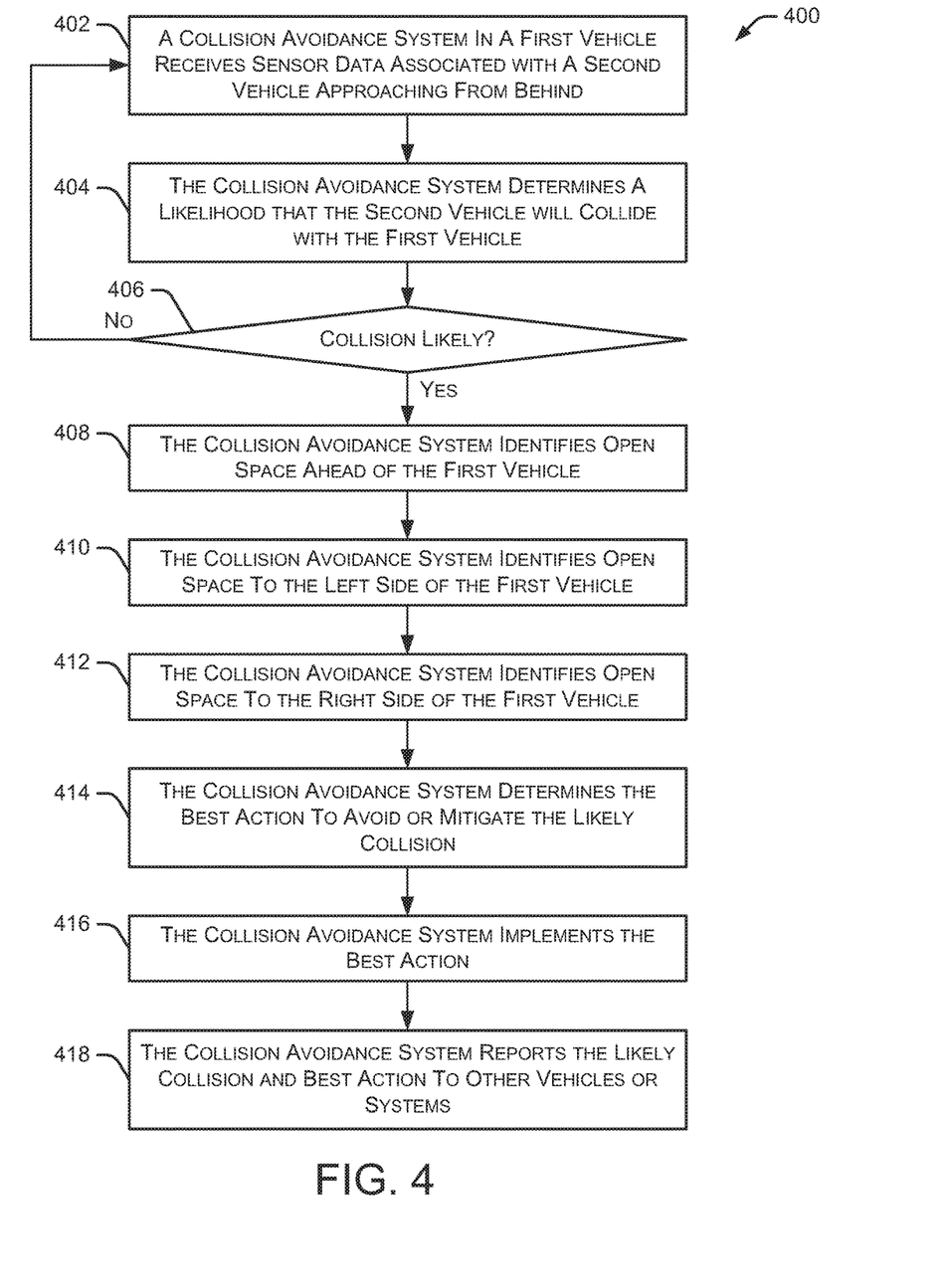
FIG. 4 illustrates an embodiment of a method for detecting and avoiding a collision between two vehicles.

FIG. 4 illustrates an embodiment of a method 400 for detecting and avoiding a collision between two vehicles. Initially, a collision avoidance system in a first vehicle receives 402 sensor data associated with a second vehicle approaching from behind. The sensor data includes, for example, one or more of camera data, LIDAR data, radar data, and ultrasound data. The collision avoidance system determines 404 a likelihood that the second vehicle will collide with the first vehicle. If method 400 determines that a collision is not likely 406 (e.g., the second vehicle is stopping and has time to completely stop before impacting the first vehicle), the collision avoidance system continues receiving 402 sensor data.

If method 400 determines at 406 that a collision is likely (e.g., the second vehicle is not stopping or does not have enough space to completely stop before impacting the first vehicle), the collision avoidance system identifies 408 open space ahead of the first vehicle. The collision avoidance system also identifies 410 open space to the left side of the first vehicle (e.g., in an adjacent lane of traffic). Additionally, the collision avoidance system identifies 412 open space to the right side of the first vehicle, such as an adjacent lane of traffic or a shoulder of a roadway. The collision avoidance system then determines 414 the best action to avoid or mitigate the likely collision. For example, the system may determine that the best action for the first vehicle is to change lanes to the left, change lanes to the right, or drive forward to get as close as possible to a vehicle ahead of the first vehicle. Driving forward closer to the vehicle ahead of the first vehicle may not avoid the accident, but it can mitigate the severity of the collision by giving the second vehicle as much space as possible to slow down before the collision. After determining 414 the best action, the collision avoidance system implements 416 the best action. The collision avoidance system the reports 418 the likely collision and best action to other vehicles or systems. For example, the collision and best action can be reported to other vehicles using a V2V communication system and reported to infrastructure systems using V2X communication systems. Additionally, activities such as "brake applied" can be reported from the first vehicle to other vehicles or systems to alert those vehicles/systems that the first vehicle is slowing down. This gives the other vehicles/systems to take any necessary actions based on the braking performed by the first vehicle.

Figure 5:
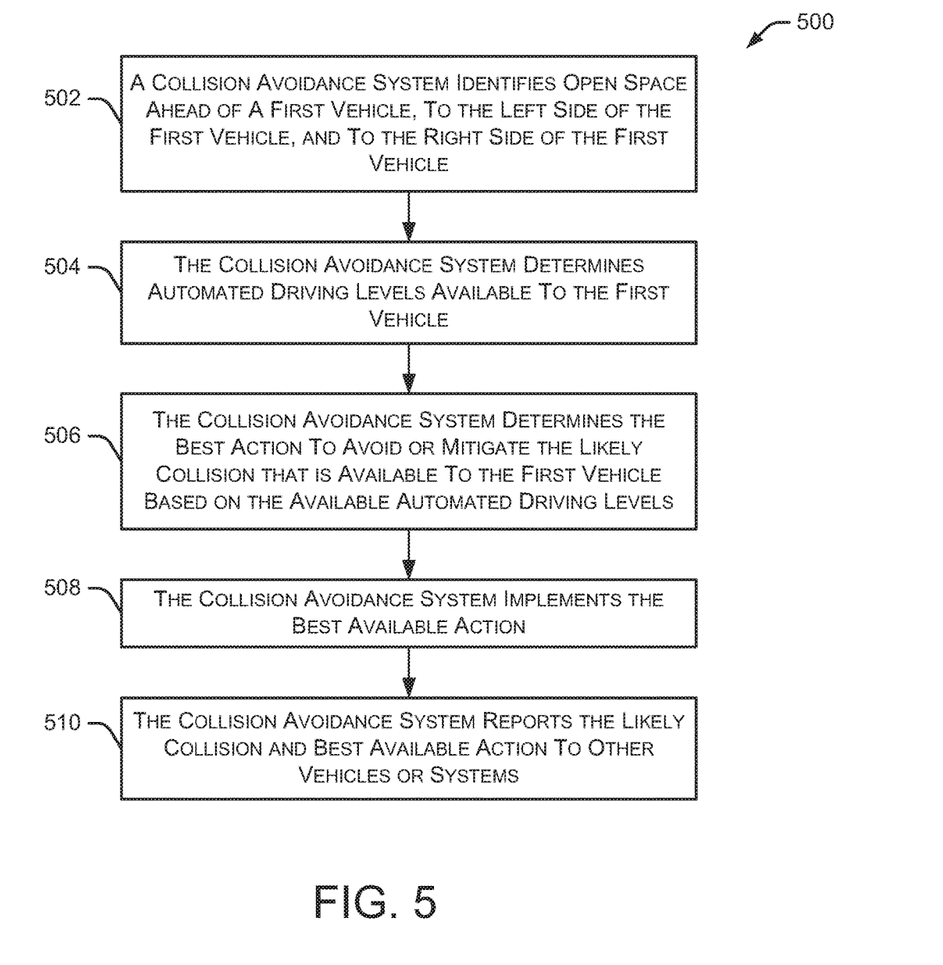
FIG. 5 illustrates an embodiment of a method for determining an action to perform that avoids or mitigates a potential collision between two vehicles.

FIG. 5 illustrates an embodiment of a method 500 for determining an action to perform that avoids or mitigates a potential collision between two vehicles. Initially, a collision avoidance system identifies 502 open space ahead of a first vehicle, to the left side of the first vehicle, and to the right side of the first vehicle. The collision avoidance system then determines 504 automated driving levels available to the first vehicle. Examples of automated driving levels are discussed above. Method 500 continues as the collision avoidance system determines 506 the best action to avoid or mitigate the likely collision that is available to the first vehicle based on the available automated driving levels. Thus, the collision avoidance system does not consider actions that are not available to the first vehicle based on the supported automated driving levels. The collision avoidance system implements 508 the best available action and reports 510 the likely collision and best available action to other vehicles or systems. As mentioned above, the collision and best action can be reported to other vehicles using a V2V communication system and reported to infrastructure systems using V2X communication systems.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   receiving data from a plurality of sensors mounted to a first vehicle;
   determining, by a collision avoidance system, a likelihood that a second vehicle will collide with the back of the first vehicle based on the received data; and
   responsive to determining a likelihood of collision:
      identifying open space near the first vehicle;
      determining automated driving levels available to the first vehicle;
      determining a best action to avoid or mitigate the likely collision based on the identified open space; and
      wherein determining a best action to avoid or mitigate the likely collision is further based on the automated driving levels available to the first vehicle.

2. The method of claim 1, wherein the plurality of sensors include one or more of a LIDAR sensor, a radar sensor, and a camera.

3. The method of claim 1, wherein identifying open space near the first vehicle includes:
   identifying open space ahead of the first vehicle;
   identifying open space to the left side of the first vehicle; and
   identifying open space to the right side of the first vehicle.

4. The method of claim 3, wherein the best action to avoid or mitigate the likely collision includes driving the first vehicle forward into the open space ahead of the first vehicle.

5. The method of claim 3, wherein the best action to avoid or mitigate the likely collision includes driving the vehicle into the open space to the left side of the first vehicle.

6. The method of claim 3, wherein the best action to avoid or mitigate the likely collision includes driving the vehicle into the open space to the right side of the first vehicle.

7. The method of claim 1, further comprising implementing the best action to avoid or mitigate the likely collision.

8. The method of claim 1, further comprising reporting the likely collision and best action to other vehicles near the first vehicle.

9. The method of claim 1, further comprising reporting the likely collision and best action to an infrastructure-based system.

10. The method of claim 1, wherein determining a likelihood of collision includes:
    determining a distance between the first vehicle and the second vehicle;
    determining a speed of the second vehicle; and
    determining a likelihood that the second vehicle can stop before colliding with the first vehicle based on the distance and the speed.

11. The method of claim 1, wherein the first vehicle is an autonomous vehicle.

12. A method comprising:
    receiving, by a collision avoidance system, data from a plurality of sensors mounted to a first vehicle;
    determining, by the collision avoidance system, a likelihood that a second vehicle will collide with the back of the first vehicle based on the received data; and
    responsive to determining a likelihood of collision:
        determining, by the collision avoidance system, automated driving levels available to the first vehicle;
        identifying, by the collision avoidance system, open space near the first vehicle;
        determining, by the collision avoidance system, a best action to avoid or mitigate the likely collision based on the identified open space and the automated driving levels available to the first vehicle;
        implementing the best action to avoid or mitigate the likely collision; and
        reporting the likely collision and best action to other vehicles near the first vehicle.

13. The method of claim 12, wherein identifying open space near the first vehicle includes:
    identifying open space ahead of the first vehicle;
    identifying open space to the left side of the first vehicle; and
    identifying open space to the right side of the first vehicle.

14. The method of claim 13, wherein determining a best action to avoid or mitigate the likely collision includes one of:
    driving the first vehicle forward into the open space ahead of the first vehicle;
    driving the first vehicle into the open space to the left side of the first vehicle; and
    driving the first vehicle into the open space to the right side of the first vehicle.

15. The method of claim 12, further comprising implementing the best action to avoid or mitigate the likely collision.

16. The method of claim 12, further comprising reporting the likely collision and best action to other vehicles near the first vehicle.

17. An apparatus comprising:
    a plurality of sensors mounted to a first vehicle and configured to capture sensor data;
    a plurality of vehicle control actuators configured to adjust operation of the first vehicle; and
    a collision avoidance system coupled to the plurality of sensors and the plurality of vehicle control actuators, the collision avoidance system configured to receive and analyze the sensor data to identify a likelihood that a second vehicle will collide with the back of the first vehicle, the collision avoidance system further configured, responsive to identification of a likely collision, to:
        identify open space near the first vehicle;
        determine a best action to avoid or mitigate the likely collision based on the identified open space;
        implement the best action to avoid or mitigate the likely collision; and
        report the likely collision and best action to other vehicles near the first vehicle.

18. The apparatus of claim 17, wherein the plurality of sensors include one or more of a LIDAR sensor, a radar sensor, and a camera.

* * * * *